(12) United States Patent
Nagai et al.

(10) Patent No.: US 8,210,220 B2
(45) Date of Patent: Jul. 3, 2012

(54) PNEUMATIC TIRE

(75) Inventors: Syu Nagai, Kodaira (JP); Atsushi Miyasaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 945 days.

(21) Appl. No.: 12/158,455

(22) PCT Filed: Dec. 19, 2006

(86) PCT No.: PCT/JP2006/325285
§ 371 (c)(1),
(2), (4) Date: Sep. 3, 2008

(87) PCT Pub. No.: WO2007/072824
PCT Pub. Date: Jun. 28, 2007

(65) Prior Publication Data
US 2009/0272474 A1    Nov. 5, 2009

(30) Foreign Application Priority Data

Dec. 21, 2005 (JP) .................................. 2005-368609
Jan. 18, 2006 (JP) ..................................... 2006-9961
Mar. 30, 2006 (JP) .................................. 2006-93252

(51) Int. Cl.
B60C 11/03 (2006.01)
B60C 11/13 (2006.01)
B60C 11/04 (2006.01)

(52) U.S. Cl. .................. 152/209.3; 152/209.8; 152/901

(58) Field of Classification Search ............... 152/209.1, 152/209.3, 209.8, 209.9, 209.13, 209.28, 152/901
See application file for complete search history.

(56) References Cited

U.S. PATENT DOCUMENTS

| | | | | |
|---|---|---|---|---|
| 5,645,657 A * | 7/1997 | Iwasaki | | 152/209.9 |
| 6,109,317 A * | 8/2000 | Iwamura et al. | | 152/209.18 |
| 6,119,745 A * | 9/2000 | Sugihara | | 152/209.9 |
| 6,371,180 B1 * | 4/2002 | Hayashi | | 152/209.2 |
| 6,523,586 B1 * | 2/2003 | Eromaki et al. | | 152/154.2 |
| 6,923,231 B2 * | 8/2005 | Cantu' et al. | | 152/209.18 |

(Continued)

FOREIGN PATENT DOCUMENTS

EP     1 106 395 A2    12/2000
(Continued)

OTHER PUBLICATIONS

Chinese Office Action dated Sep. 18, 2009, with translation (12 pages).

(Continued)

Primary Examiner — Eric Hug
(74) Attorney, Agent, or Firm — Sughrue Mion, PLLC (57) ABSTRACT

A pneumatic tire having a tread surface provided with a plurality of circumferential grooves and lateral grooves each having one end opened into that circumferential groove and the other end terminating in a land portion. At least one lateral groove is always included completely in the ground contact surface of the tread. The groove width of the lateral grooves is at least locally not less than 30% of the groove width of the circumferential grooves. Each lateral groove has an extending length not less than 40% of an extending length of the circumferential grooves in the ground contact surface and is provided with a region having a cross-sectional area which increases from its side of opening into the circumferential groove toward its terminal end, and including a starting end with a minimum cross-sectional area that is situated closer to the circumferential groove in which the lateral groove opens.

7 Claims, 9 Drawing Sheets

U.S. PATENT DOCUMENTS

| | | | |
|---|---|---|---|
| 6,923,232 B1 * | 8/2005 | Welbes et al. | 152/209.18 |
| 7,434,606 B2 * | 10/2008 | Miyabe et al. | 152/209.2 |
| 7,607,464 B2 * | 10/2009 | Murata | 152/209.24 |
| 2005/0076985 A1 | 4/2005 | Colombo et al. | |
| 2007/0051448 A1 * | 3/2007 | Yumii | 152/209.18 |

FOREIGN PATENT DOCUMENTS

| | | |
|---|---|---|
| EP | 1 106 395 A2 | 6/2001 |
| JP | 07-329515 A | 12/1995 |
| JP | 08-040015 A | 2/1996 |
| JP | 10-287108 A | 10/1998 |
| JP | 2004-523422 A | 8/2004 |
| WO | 02/078982 A1 | 10/2002 |
| WO | 2004/103737 A1 | 12/2004 |
| WO | WO 2004/103737 * | 12/2004 |

OTHER PUBLICATIONS

Supplementary European Search Report dated Oct. 28, 2008 (9 pages).

Japanese Office Action issued in Application No. 2007-551100 dated May 8, 2012.

* cited by examiner

(a)
Conventional tire

Vehicle inner side    A   B    C   D    Vehicle outer side (b)
Control ture
Embodiment tire Vehicle inner side    A   B    C   D    Vehicle outer side

PNEUMATIC TIRE

TECHNICAL FIELD

The present invention relates to a pneumatic tire, such as a radial pneumatic tire, which is capable of effectively suppressing the so-caller columnar resonance noise caused by a circumferential groove formed in a tread surface to extend continuously in the circumferential direction of the tire.

BACKGROUND ART

In a tread pattern wherein the tread surface of a tire has a circumferential groove extending continuously in the circumferential direction, an elongated space is defined in a ground contact area of the tread surface between the circumferential groove and the road surface, having an open leading end and an open trailing end. Since the columnar resonance noise assumes a significant part in the total tire noise, it is an imminent task to suppress the columnar resonance noise or disperse the resonance frequency. Thus, there has been proposed a solution which provides a lateral groove, including an inclined groove, so as to extend in the tire width direction with its one end opened into the circumferential groove.

It is known that such a lateral groove is adapted to change the frequency of the columnar resonance noise, depending upon its configuration. Among others things, Patent Document 1 (WO 2002/078982 A1) describes that, when a lateral groove opening only into a circumferential groove has the other end that terminates in a land portion, the frequency of the columnar resonance noise caused by the circumferential groove is lowered.

Thus, the applicant previously proposed a technology as disclosed in Patent Document 2 (WO 2004/103737 A1), which improves the quietness of tires by elaborating the shape and structure of the lateral groove. This proposal provides a pneumatic tire capable of dispersing the frequency of the columnar resonance noise and lower the sound pressure level, by means of an arrangement wherein the tread surface is provided with two or more circumferential grooves continuously extending in the circumferential direction of the tire, and a plurality of lateral grooves, each having one end opened to at least one predetermined circumferential groove and the other end terminated in a land portion, are formed independently from the other lateral grooves opened into the other circumferential groove and a ground contact end of the tread. In other words, each lateral groove extends without crossing the other lateral grooves that can be opened into the other circumferential groove and/or the ground contact end of the tread, apart from the lateral grooves that extends into the same circumferential groove. The circumferential grooves and the lateral grooves have their respective widths determined such that their opposite groove walls do not contact each other under the tire posture wherein the tire is mounted onto an approved rim, filled with the maximum air pressure and loaded with a mass that corresponds to the maximum load capacity of the tire. The lateral grooves are arranged so that at least one lateral groove is always included completely in the ground contact surface of the tread. An extending length of a portion of each lateral groove in the ground contact surface, having a groove width of the lateral groove corresponding to not less than 30% of a groove width of the predetermined circumferential groove, is made not less than 40% of an extending length of the predetermined circumferential groove in the ground contact surface. Such a pneumatic tire makes it possible to disperse the frequency of the columnar resonance noise while simultaneously lowering the sound pressure level of the resonance noise.

Patent Document 1: WO 2002/078982 A1
Patent Document 2: WO 2004/103737 A1

DISCLOSURE OF THE INVENTION

Problem to be Solved by the Invention

In order to carry out the invention disclosed in the Patent Document 2 according to the applicant's earlier proposal, the tread pattern is designed so as to fully preserve the steering stability, anti-wear durability and other performance of tires. On this occasion, it has been found by the inventors that even with a constant length of the lateral grooves, variation in their cross-sectional area results in variation in the lowering effect for the sound pressure level of the columnar resonance noise.

Figure 9:
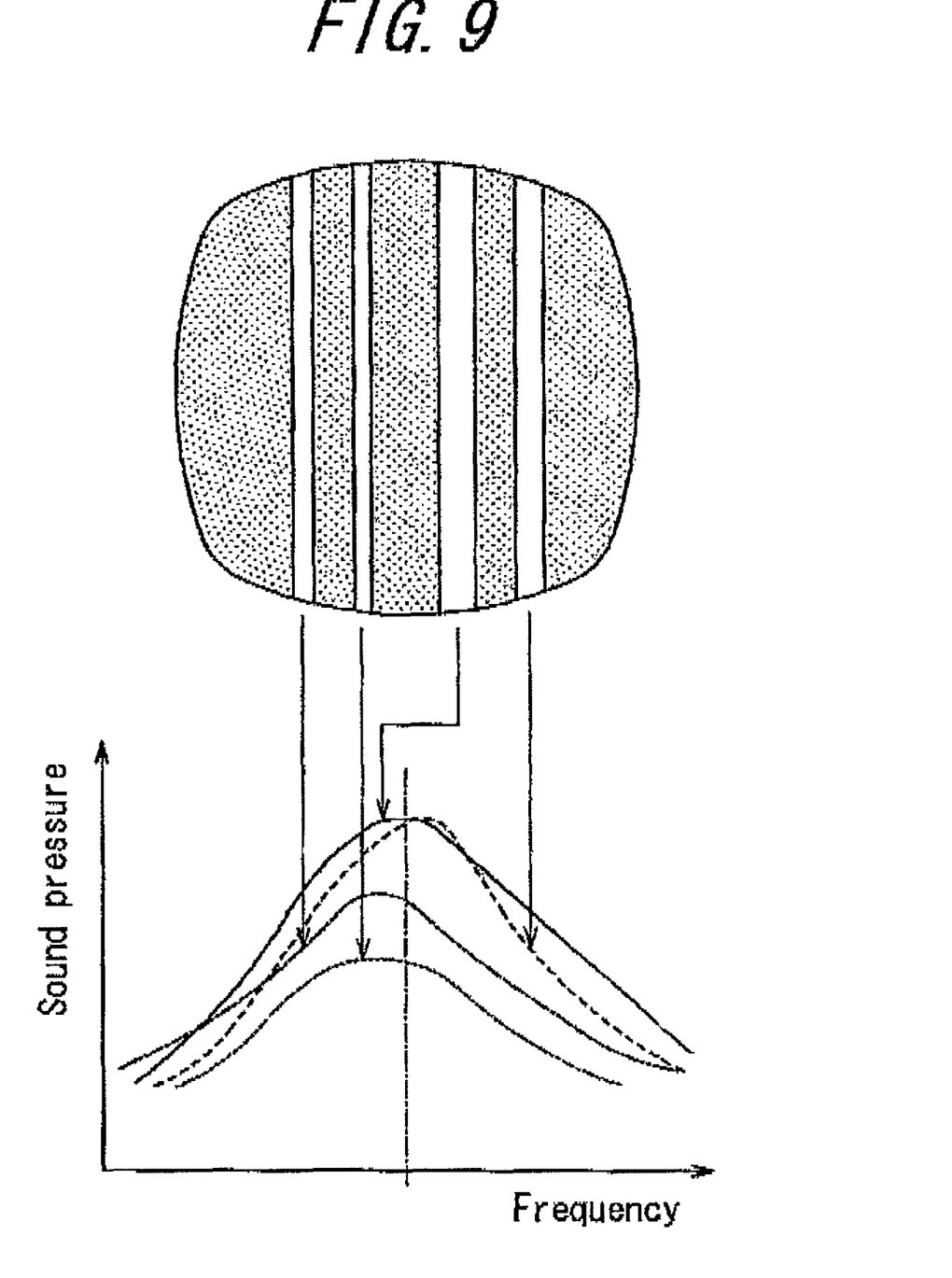
FIG. 9 is a view exemplarily showing the columnar resonance frequencies.
Figure 10:
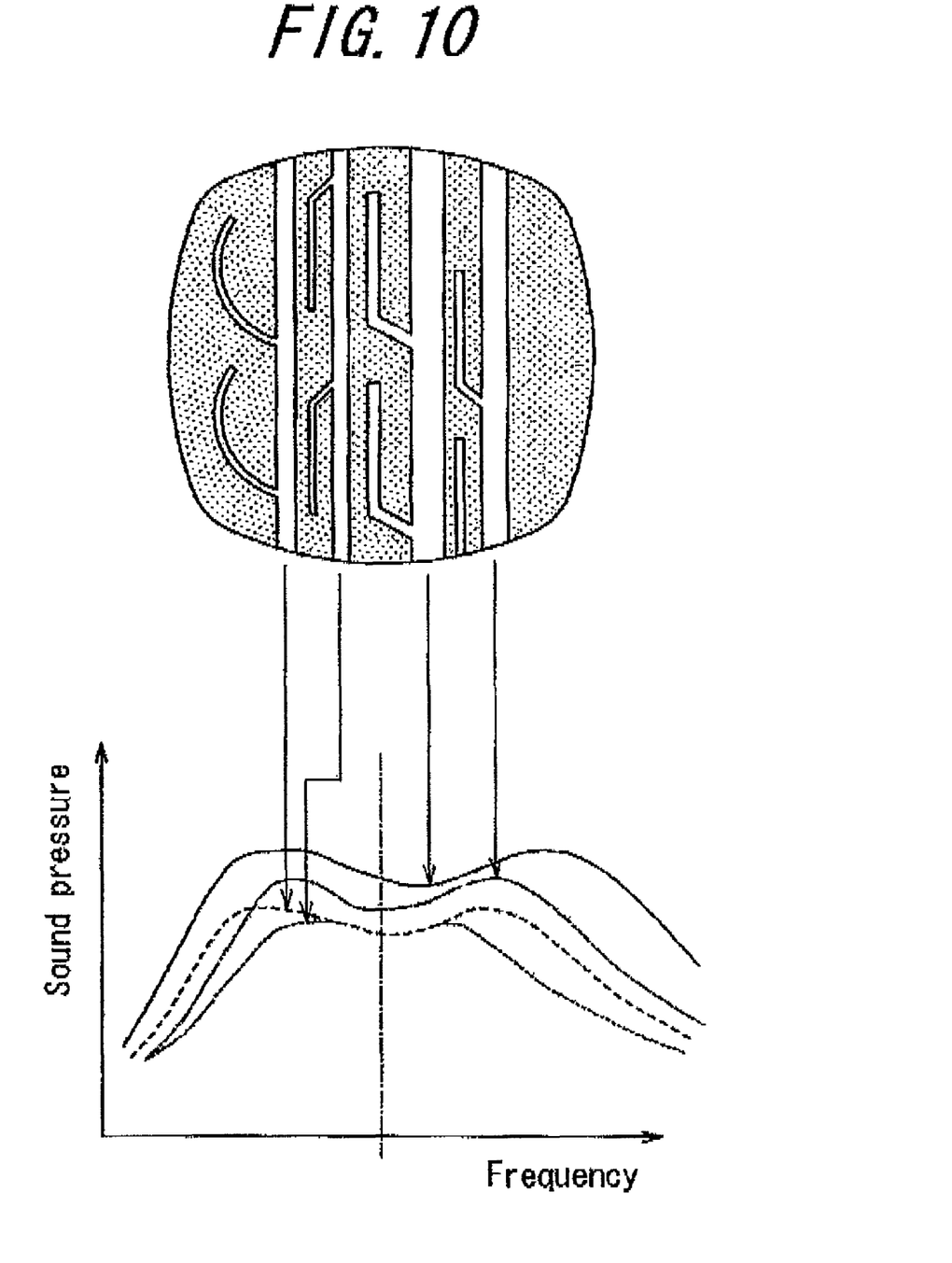
FIG. 10 is a view showing an example of dispersed columnar resonance frequencies

On the other hand, as regards the ground contacting status of the tread surface in actual tires, the plurality of circumferential grooves are similar in the extension length in the ground contact surface so that, as schematically exemplified by FIG. 9 showing the footprint of the tread surface, the circumferential grooves each generates a columnar resonance noise with a frequency that is substantially close to each other. Therefore, the columnar resonance noise has a sound pressure that is marked as compared to the sound pressure at other frequency ranges, and is thus recognized as rude noise to the ear of the vehicle passengers. The invention disclosed in Patent Document 2 according to the applicant's earlier proposal has been applied for the purpose of lowering such columnar resonance noise and/or dispersing the columnar resonance frequency, by forming lateral grooves for the respective circumferential grooves such that each lateral groove opens into the circumferential groove at one end and terminates in a land region at the other end, and has an extension length within the ground contact surface, which amounts to 40 to 90%, preferably 50%, of the extension length of the circumferential groove. On this occasion, as schematically exemplified by FIG. 10 showing the footprint of the tread surface, it has been found that the original columnar resonance noise is effectively lowered and the new columnar resonance noise has a frequency that is effectively dispersed. In this instance, however, since the lateral grooves have substantially the same width, i.e., 50% of the extension length of the circumferential groove within the ground contact surface, the newly generated columnar resonance frequencies overlap with each other even after dispersion of the columnar frequency range. This results in a new problem that the sound pressure of the dispersed resonance frequency still assumes a large part as compared to the sound pressure of the environmental frequency.

Based on the above-mentioned recognition, the present invention provides an improvement in the pneumatic tire disclosed in Patent Document 2 identified above. It is an object of the present invention to provide to provide a pneumatic tire capable of sufficiently enhancing the frequency dispersion effect for the columnar resonance noise due to the presence of the circumferential grooves, per se, or enhancing the lowering effect for the sound pressure level, in association with the cross-sectional area of the lateral grooves. It is another object of the present invention to provide a pneumatic tire, in particular a radial pneumatic tire, capable of effectively making the generated noise as a white noise in association with the original lowering of the columnar resonance noise) by sufficiently dispersing the resonance frequency with respect to the plurality of circumferential grooves, respectively.

Means for Solving the Problem

According to a first aspect of the present invention, there is provided a pneumatic tire comprising a tread surface provided with at least two circumferential grooves extending continuously in a circumferential direction, wherein at least one of said circumferential grooves is provided with a plurality of lateral grooves each having one end opened into that circumferential groove and the other end terminating in a land portion, independently from other circumferential grooves, other lateral grooves opening into said other circumferential grooves or in a ground contacting end of a tread, said circumferential grooves and said lateral grooves having their respective groove widths determined such that their opposite groove walls do not contact each other under a tire posture wherein the tire is mounted onto an approved rim, filled with the maximum air pressure and loaded with a mass that corresponds to the maximum load capacity of the tire, said lateral grooves being arranged so that at least one lateral groove is always included completely in the ground contact surface of the tread, said groove width of the lateral grooves being at least locally not less than 30% of the groove width of said circumferential grooves, e.g., 4 to 20 mm, and said lateral grooves each having an extending length which is not less than 40% of an extending length of said circumferential grooves in said ground contact surface, e.g., 60 to 250 mm, wherein said lateral grooves are each provided with a region having a cross-sectional area which increases from its side of opening end into the circumferential groove toward its side of the terminal end, said region of increasing cross-sectional area having a starting end with a minimum cross-sectional area point which is situated closer to the circumferential groove in which the lateral groove opens, than a maximum cross-sectional area point at the terminal end of said region of increasing cross-sectional area.

Therefore, within the meaning of the present invention, the term "groove" includes a groove having groove sidewalls that are partly in contact with each other in the depth direction of the groove. However, narrow grooves or sipes of such a narrow width, wherein the groove sidewalls are entirely in contact with each other in the ground contact surface, do not constitute the circumferential groove or lateral groove within the meaning of the invention. Moreover, the "minimum cross-sectional area point" according to the invention is not situated at a location that is more remote from the circumferential groove than the maximum cross-sectional area point.

It is noted that, as used herein, the term "approved rim" refers to a rim defined in the following standard, the term "maximum air pressure" refers to an air pressure corresponding to the maximum load capacity defined in the following standard, and the term "maximum load capacity" refers to the maximum mass allowed to be applied to the tire in the following standard.

The standard refers to an effective industrial standard available at an area in which the tires are produced or used, respectively, e.g., "*Year Book*" published by The Tire and Rim Association Inc. in the United States, "*Standards Manual*" published by The European Tyre and Rim Technical Organization in Europe, and "*JATMA YEAR BOOK*" published by The Japan Automobile Tire Manufacturing Association, Inc. in Japan.

Also, the term "ground contact surface" as used herein refers to a surface region of a tread rubber in contact with a flat plate when the tire is mounted on an approved rim and placed vertically on the flat plate under an inflation of the maximum air pressure and loaded with a mass corresponding to the maximum load capacity. Furthermore, the cross-sectional area of the groove refers to a groove cross-sectional area within a plane that intersects at right angles with the groove centerline of the lateral groove.

In such a pneumatic tire, it is preferred that the minimum cross-sectional area point of the lateral groove is situated at a location within a range of not more than 50% of the length of the lateral groove of typically 20 to 230 mm, as measured from the opening end of the lateral groove into the circumferential groove. It is also preferred that the lateral groove has a ratio (S1/S2) of the minimum cross-sectional area (S1) to the maximum cross-sectional area (S2), said ratio being within a range of not less than 0.1 and not more than 0.75.

According to a second aspect of the present invention, there is provided a pneumatic tire comprising a tread surface provided with at least two circumferential grooves extending continuously in a circumferential direction, wherein at least one of said circumferential grooves is provided with a plurality of lateral grooves each having one end opened into that circumferential groove and the other end terminating in a land portion, independently from other circumferential grooves, other lateral grooves opening into said other circumferential grooves or in a ground contacting end of a tread, said circumferential grooves and said lateral grooves having their respective groove widths determined such that their opposite groove walls do not contact each other under a tire posture wherein the tire is mounted onto an approved rim, filled with the maximum air pressure and loaded with a mass that corresponds to the maximum load capacity of the tire, said lateral grooves being arranged so that at least one lateral groove is always included completely in the ground contact surface of the tread, said groove width of the lateral grooves being at least locally not less than 30% of the groove width of said circumferential grooves, and said lateral grooves each having an extending length which is not less than 40%, preferably within a range of 40% to 90%, of an extending length of said circumferential grooves in said ground contact surface, wherein at leas two rows of the land portions are provided with said lateral groove, and said lateral groove has different extending lengths in the respective land portions, so as to afford a mutual variation in the ratio of the length of each lateral groove in the ground contact surface, to the extending length, in the ground contact surface, of the circumferential groove, into which that lateral groove opens. Therefore, here also, narrow grooves or sipes of such a narrow width wherein the groove sidewalls are entirely in contact with each other in the ground contact surface, do not constitute the circumferential groove or lateral groove within the meaning of the invention.

The term "lateral groove" within the meaning of the present invention refers to a groove that extends with a branch-like shape, irrespectively of the magnitude of its intersection angle relative to the tire equatorial plane, or of presence of bending or branching. Further, the "extending length" of the lateral groove refers to the maximum length as measured along the groove centerline, and this applies to the pneumatic tire of the above-mentioned first aspect as well. Moreover, the terms "approved rim", "maximum air pressure" and "maximum load capacity" are used in the same meanings as above.

In such a pneumatic tire, it is preferred to provide a lateral groove that opens into a circumferential groove with a maximum groove volume. It is also preferred to provide a tread pattern that is asymmetrical with respect to an equator of the tire, and arrange the lateral groove so as to open into a circumferential groove that extends on an inner side of a vehicle when the tire is mounted to the vehicle.

Effects of the Invention

Figure 1:
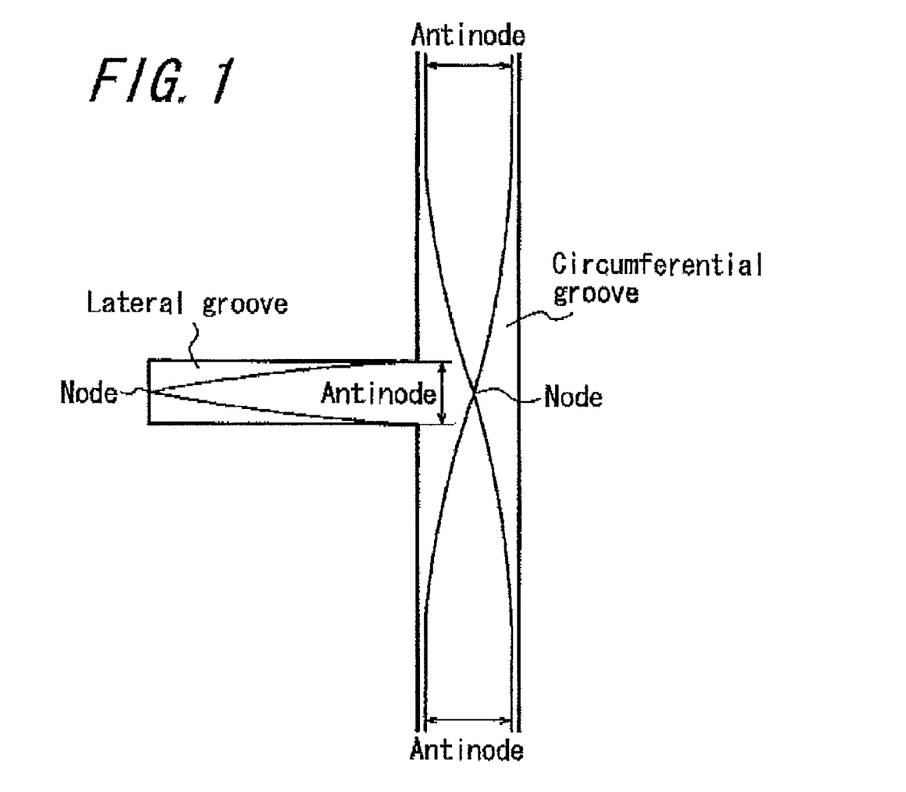
FIG. 1 is a schematic view exemplarily showing the mechanism for reducing the columnar resonance noise by the circumferential grooves.

With the invention disclosed in Patent Document 2 identified above, as schematically shown in FIG. 1, the sound pressure attenuation effect is achieved by causing interference of the columnar resonance noise generated by the circumferential grooves, with the columnar resonance noise generated by the lateral grooves as antiresonance. In this instance, when the lateral groove is formed as a blind groove with its one end opened into the circumferential groove and the other end terminated in the land portion, the lateral groove generates a columnar resonance with the terminal end of the lateral groove as a node of vibration and the opening end to the circumferential groove as an antinode, with the result that the gas speed becomes the maximum at the opening end to the circumferential groove.

The pneumatic tire according to the first aspect of the invention takes such kinematic gas speed into consideration, and it to enhance the interference effect by the lateral grooves by increasing the gas speed, based on consideration that the gas speed is one of factors dominant over the interference effect by the lateral grooves with the columnar resonance of the circumferential grooves.

Figure 2:
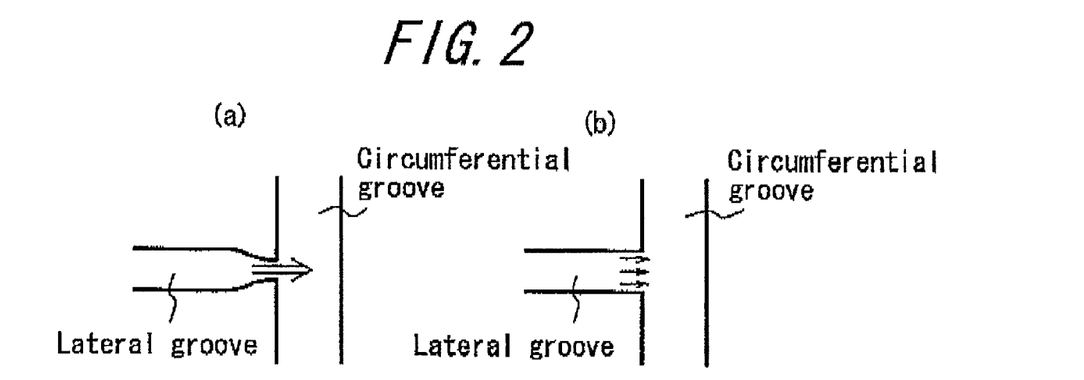
FIGS. 2(a) and 2(b) are schematic view exemplarily showing the mode of increase in the gas flow speed in the lateral groove.

Considering a fluid flow within a conduit, generally, the pressure differential becomes large across a portion of the conduit where the cross-sectional area is decreased, and the flow speed of the fluid increases at the portion with a decreased cross-sectional area. This is similarly applicable to the resonance of gas generated in a lateral groove that opens into a circumferential groove. Thus, as exemplarily shown in FIG. 2(*a*), by intentionally decreasing the cross-sectional area of the lateral groove in the vicinity of its opening end to the circumferential groove, as compared to the cross-sectional area in the terminal end portion, it is possible to significantly increase the gas speed at the opening end to the circumferential groove. This results in that the interference effect by the lateral grooves with the resonance generated by the gas column in the circumferential grooves can be significantly enhanced, in comparison to the case in which the cross-sectional area is made constant, as exemplarily shown in FIG. 2(*b*).

Thus, with the pneumatic tire according to the first aspect of the invention, wherein the minimum cross-sectional area point of the increasing cross-sectional area region is situated closer to the circumferential groove than the maximum cross-sectional area point, it is possible to sufficiently preserve the required performance of tires such as steering stability with respect to dry road surface and wet road surface, anti-wear durability, etc., while effectively lowing the noise level due to the columnar resonance of the circumferential grooves.

Now, even if a cross-sectional area decreased portion is provided in the lateral groove and the gas speed is once increased at the cross-sectional area decreased portion, the gas speed is decreased again as gas flows farther therefrom. Thus, in order to ensure that the lateral grooves effectively exhibit the desired interference effect due to the provision of the cross-sectional area decreasing portion, it is preferred that the cross-sectional area decreasing portion Is situated close to the circumferential groove. Based on such viewpoint, the inventors conducted thorough investigations which resulted in a novel recognition that the lateral grooves are able to effectively exhibit the desired interference effect if the minimum cross-sectional area point of the lateral groove within the meaning of the invention is situated at a location within a range of 50% of the length of the lateral groove, which is generally 20 to 230 mm.

Furthermore, when the lateral groove is provided with a cross-sectional area decreasing portion at a location close to the opening end into the circumferential groove, in order to increase the gas flow speed as a result of the pressure differential across the cross-sectional area decreasing portion, it is necessary for the terminal end portion of the lateral groove to have a cross-sectional area which is larger, to some extent, than the cross-sectional area decreasing portion. On the contrary, if the cross-sectional area of the terminal end portion is not larger than a predetermined value, while it is possible to realize the desired gas flow speed by making extremely small the cross-sectional area of the cross-sectional area decreasing portion, the gas flow volume becomes then insufficient, thereby making it difficult to significantly enhance the interference effect by the lateral grooves with the columnar resonance in the circumferential grooves.

Therefore, it is preferred that the ratio (S1/S2) of the minimum cross-sectional area (S1) to the maximum cross-sectional area (S2) is not less than 0.1 to not more than 0.75, so as to realize a desired speed of the gas within the lateral grooves without insufficiency of the flow volume. If the ratio is less than 0.1, a sufficient flow speed can still be obtained due to a large pressure differential across the cross-sectional area changing region, though the absolute flow volume becomes insufficient due to the narrow passage, which his not very suitable in achieving an enhanced interference effect. On the other hand, if the ratio is above 0.75, sufficient flow speed cannot be obtained due to a small pressure differential across the cross-sectional area changing region, and it is likely that only an insufficient interference effect is achieved, which substantially is comparable to that of the prior art lateral groove without change in the cross-sectional area.

Figure 3:
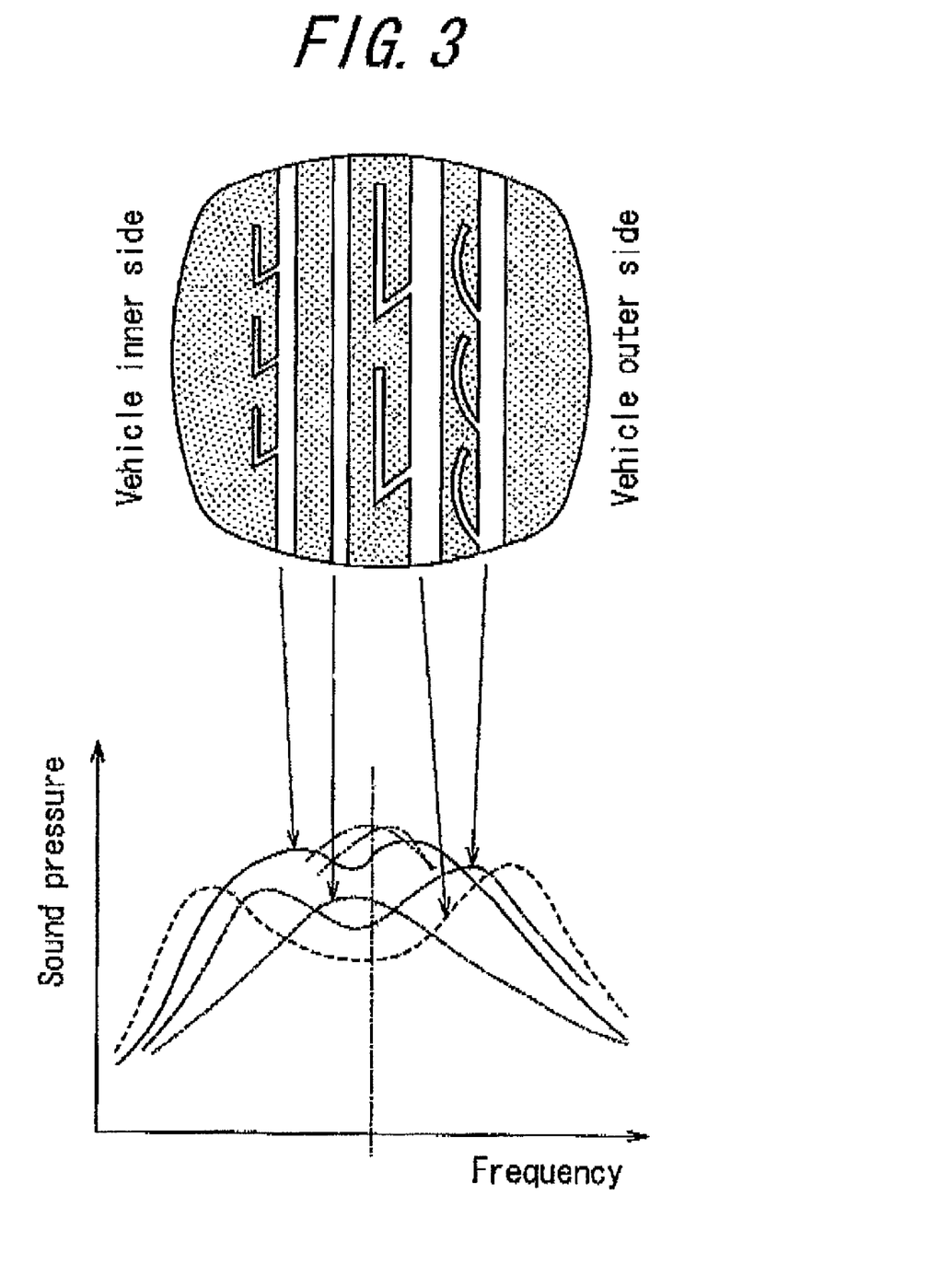
FIG. 3 is a schematic view exemplarily showing the noise reduction mechanism in the pneumatic tire according to the second aspect of the invention.

Moreover, the pneumatic tire according to the second aspect of the invention includes the lateral groove opened into two or more circumferential grooves, each lateral groove having extending lengths which are made different with respect to the respective land portions around a particularly effective range of 50% of the length (generally 60 to 250 mm) of the circumferential groove in the ground contact surface. In this way, it is possible to effectively reduce the sound pressure of the columnar resonance noise inherent to the circumferential grooves, and to simultaneously disperse the columnar resonance frequencies of the respective circumferential grooves depending mainly upon the lengths of the respective lateral grooves. It is thus possible to effectively suppress the sound pressure of the resonance noise after the dispersion, from becoming too large and marked as compared to the sound pressure of the surrounding frequencies, and to thereby effectively make the generated tire noise as a white noise. This is schematically illustrated by FIG. 3 which shows the footprint of a tread surface and in which the imaginary lines indicate the peak portions in case where the lateral grooves are not provided, as part of the frequency analysis shown in FIG. 9.

Here, the lateral groove opening into two or more circumferential grooves has different relative lengths by itself. This is to ensure that the ratio of the extending length of each lateral groove in the ground contact surface to the length, in the ground contact surface, of the circumferential grooves into which the lateral groove opens is made mutually different from the other. Practically, however, the length of the circumferential grooves in the ground contact surface is substantially constant, i.e., substantially without noticeable change. Therefore, the length of the lateral groove can be defined as an absolute value, which is easy to define and easy to objectively recognize.

With such a pneumatic tire, if the lateral groove opens into a circumferential groove with a maximum groove volume, even when the lateral grooves cannot be provided for all the circumferential grooves, it is possible to effectively lower the columnar resonance noise since the lateral grooves achieve the desired function with respect to the circumferential grooves of a large volume, in which the sound pressure to level of the columnar resonance noise becomes the maximum.

Now, in the case of a pneumatic tire having a plurality of circumferential grooves in the tread surface, in which the columnar resonance noise generated by the respective circumferential grooves has a substantially constant sound pressure and a substantially constant columnar resonance frequency, the columnar resonance noise generated by the circumferential groove on the inner side of a vehicle, which is close to the cabin when the tire is mounted to the vehicle is more influential to passengers within the cabin than the columnar resonance noise generated by the circumferential groove on the outer side of the vehicle. Therefore, it is preferred for the tire to have an asymmetric tread pattern so as to reduce the number or volume of the circumferential grooves in the region corresponding to the inner side of the vehicle, and thereby eliminate the risk of generating a large columnar resonance noise. At the same time, it is preferred that the lateral grooves are arranged to open into the circumferential grooves that extend on the inner side of the vehicle, in order that the lateral grooves advantageously achieve the resonance noise reduction function and the resonance frequency dispersing function, even when the circumferential grooves must be inevitably provided in the region on the inner side of the vehicle, in order to realize an effective noise reduction effects.

REFERENCE CODE LISTING 1, 21 . . . tread surface
2, 3, 22, 23, 24, 25 . . . linear circumferential grooves
4 . . . zigzag circumferential groove
5, 6, 27, 28 . . . land portions
7, 8, 29, 30, 31 . . . lateral grooves
7a, 8a . . . narrow portions
7b, 8b . . . wide portions
9 . . . intermittent groove
10 . . . sipe
11 . . . circumferential sipe
12 . . . inclined sipe
13 . . . reverse sipe
14, 15 . . . sipes with upper right inclination
16, 17 . . . inclined sipes
30a, 31a . . . base portion
30b, 31b . . . bent portion
30c . . . branch portion
32, 33 . . . sipes with upper left inclination
E . . . tire equatorial plane
e1, e2 . . . tread surface end
$l_1, l_2$ . . . extending length of the lateral groove
l . . . length of the lateral groove
$L_1, L_2$ . . . extending length of the circumferential groove
A . . . minimum cross-sectional area point
B . . . maximum cross-sectional area point
C . . . centerline of the groove
S1 . . . minimum cross-sectional area
S2 . . . maximum cross-sectional area

BEST MODE FOR CARRYING OUT THE INVENTION

Figure 4:
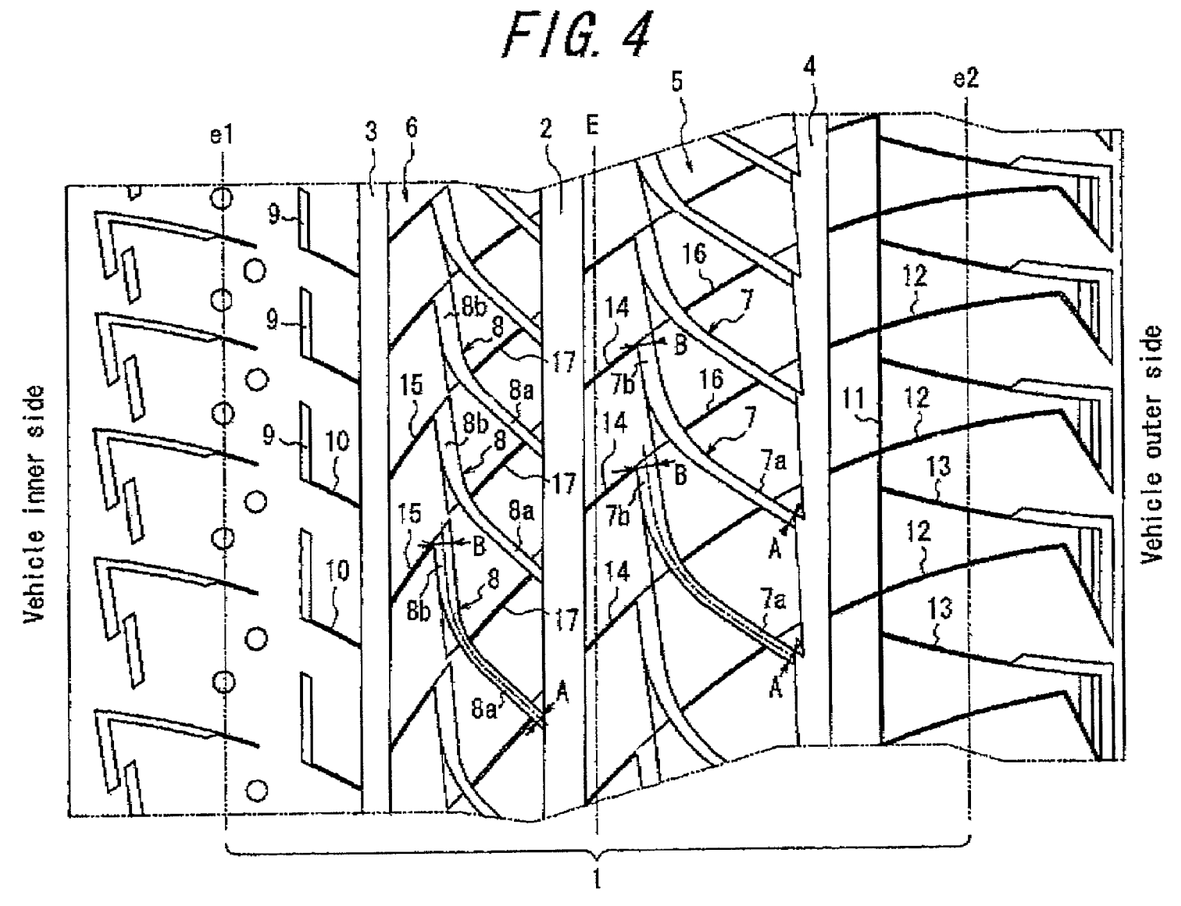
FIG. 4 is a developed view of the tread pattern embodying the pneumatic tire according to the first aspect of the invention.

The present invention in its first aspect provides a pneumatic tire having a tread pattern, of which the developed view is shown in FIG. 4. The pneumatic tire has an internal reinforcing structure, which is similar to that of a general radial tire; hence, illustration of this structure is omitted. Reference numeral 1 denotes a tread surface that is divided into left-half side and right-half side with reference to a tire equatorial line E as shown in the figure. The left-half side, which is situated on the inner side of the vehicle when the tire is mounted to the vehicle, is provided with two circumferential grooves 2, 3 continuously extending in a straight manner in the circumferential direction. The right-half side is provided with a zigzag-shaped circumferential groove 4 continuously extending in the circumferential direction, of which only the sidewall situated on the side of the equatorial line is of saw-teeth shape. A plurality of lateral grooves 7, 8 are provided, which may be inclined grooves, each having one end opened into a corresponding one of the zigzag-shaped circumferential groove 4 and the straight circumferential groove 2 on the side of the tire equatorial line, and another end that is terminated in a land portion 5, 6 between the circumferential grooves 4 and 2, or between the circumferential grooves 2 and 3. The lateral grooves 7, 8 are spaced from each other by a predetermined distance in the circumferential direction. The lateral grooves 7, 8 are arranged independently from other lateral grooves that may be provided to open into the other circumferential groove 3, or to open at a ground contacting end of the tread.

Here, the lateral grooves 7, 8 are arranged also independently from the other lateral grooves that may be provided to open into the other circumferential groove 3, apart from other lateral grooves (not shown) that may be provided to extend from the relevant circumferential grooves 4, 2.

The lateral grooves 7, 8 each extends toward upper left as a whole, and is substantially in the form of L as defined by a narrow portion 7a, 8a extending with a relatively large angle relative to the tire equatorial line E to open into the relevant circumferential groove 4, 2, and a wide portion 7b, 8b connected to the narrow portion 7a, 8a via a bent portion and extending with a relatively small angle relative to the tire equatorial line E.

A plurality of intermittent grooves 9 extending in the circumferential direction are provided as being spaced by a predetermined distance, at a location shifted from the circumferential groove 3 toward the tread surface end e1, i.e., on the side of the ground contacting end. The intermittent grooves 9 each has a lower end as shown in the figure, which is in communication with the circumferential groove 3 through a sipe 10 that extends toward lower right. A circumferential sipe 11 is provided to extend continuously in a straight manner in the circumferential direction, at a location which is shifted from the zigzag-shaped circumferential groove 4 toward the other tread surface end e2. A plurality of inclined sipes 12 are provided so as to extend toward upper right across the circumferential sipe 11 and to open into the circumferential groove 4 and at the tread surface end e2. Furthermore, a plurality of reverse sipes 13 are provided to extend from the circumferential sipe 11 toward lower right, and to open at the tread surface end e2.

The land portion 5 between the circumferential grooves 4, 2 as well as the land portion 6 between the circumferential grooves 2, 3 are provided, respectively, with inclined sipes 14, 15 extending toward upper right to communicate the terminal ends of the lateral grooves 7, 8 with the relevant circumferential grooves 2, 3, and further provided, respectively, with inclined sipes inclined sipes 16, 17 between the two lateral grooves 7, 7 or 8, 8.

Figure 5:
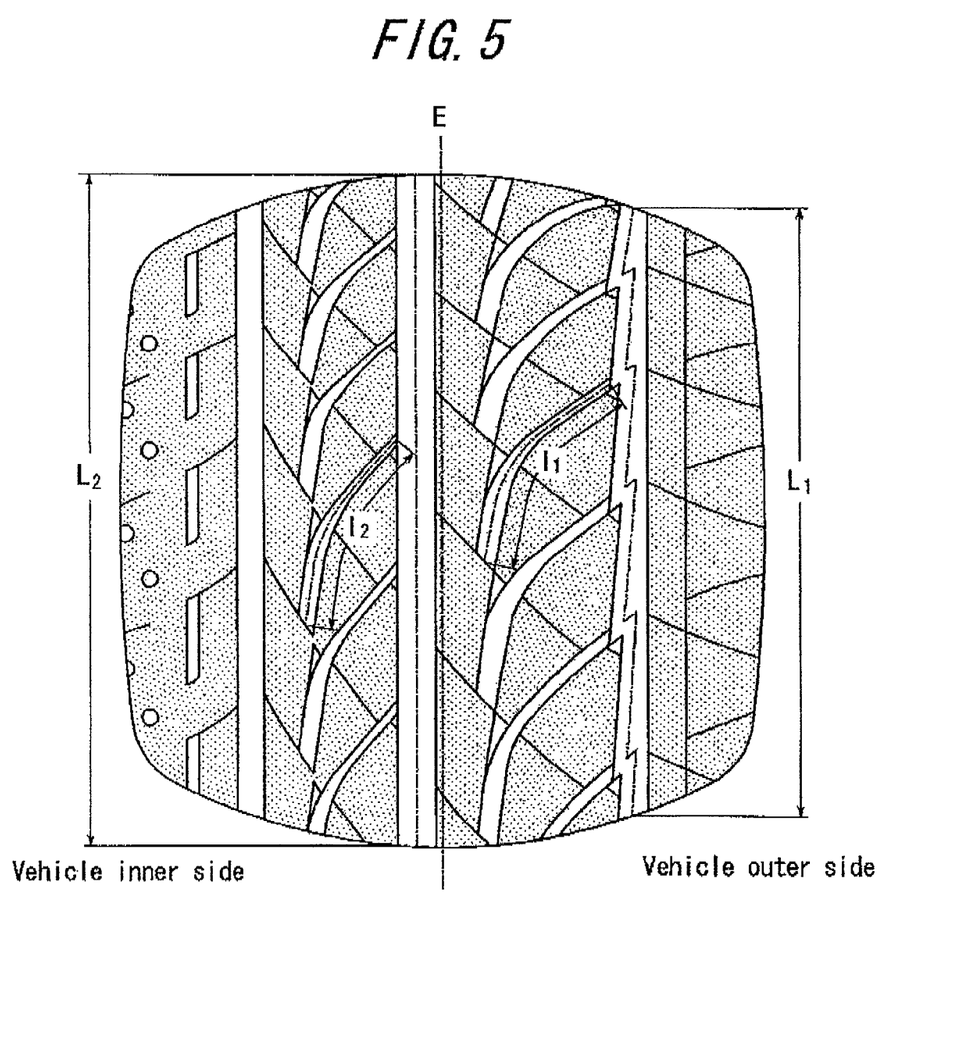
FIG. 5 is a view showing the footprint of the tread pattern of FIG. 4.

Each of the circumferential grooves 4, 2 and the lateral grooves 7, 8 has a groove width that is determined such that its opposite groove walls do not contact each other over the entirely of its depth, under a tire posture wherein the tire is mounted onto an approved rim, filled with the maximum air pressure and loaded with a mass that corresponds to the maximum load capacity of the tire, as shown in FIG. 5 by the footprint under such conditions. The lateral grooves 7, 8 are arranged so that at least one lateral groove is always included completely in the ground contact surface of the tread. Each lateral groove 7, 8 has at least locally a groove width of not less than 30% of the groove width of the circumferential groove 4, 2, as measured in the direction perpendicular to its centerline. Each lateral groove 7, 8 has an extending length $l_1$, $l_2$ which is not less than 40% of an extending length $L_1$, $L_2$ of the circumferential grooves 4, 2 in the ground contact surface.

Here, the groove width of the circumferential groove 2 as measured in the ground contact surface may be at least locally within a range of 4 to 20 mm, for example, and the extending length $L_1$ thereof may be within a range of 60 to 250 mm, for example. The average groove width of the circumferential groove 4 in the same ground contact surface may be within a range of 4 to 20 mm, for example, and the extending length $L_2$ thereof may be within a range of 60 to 250 mm, for example. Furthermore, the extending lengths $l_1$, $l_2$ of the lateral grooves may be both within a range of 20 to 230 mm.

Figure 6:
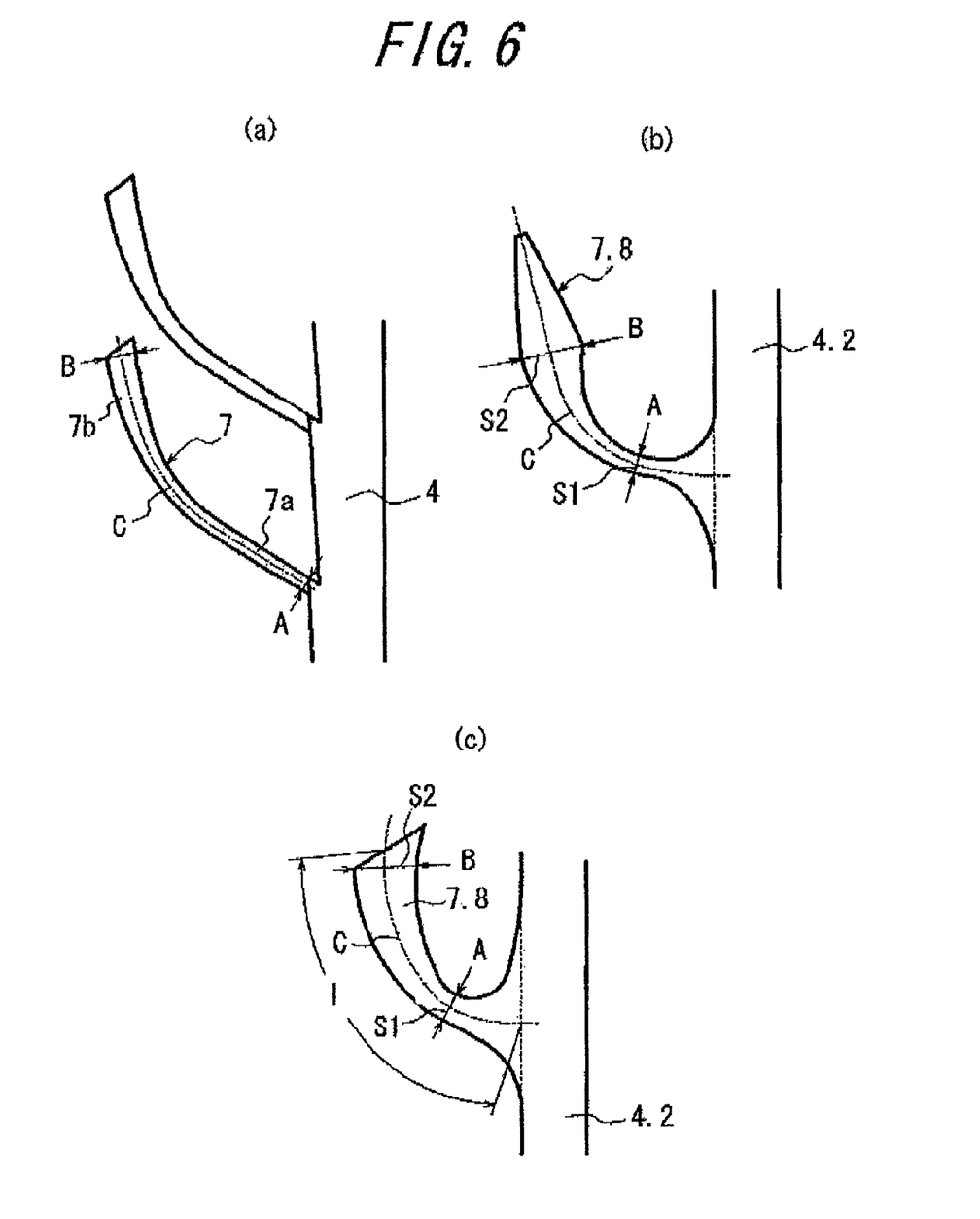
FIGS. 6(a) to 6(c) are enlarged views exemplarily showing the minimum cross-sectional area point.

Each lateral groove 7, 8 of the illustrated tire is further provided with an increasing cross-sectional area region extending from the side of its opening end into the circumferential groove toward the terminal end. The increasing cross-sectional area region includes a starting end with a minimum cross-sectional area, that is a point A in which the cross-sectional area as measured in a plane intersecting at right angles with the groove centerline C, as shown in FIG. 6(a) in enlarged scale with reference to one of the lateral grooves 4 shown in FIG. 4. The minimum cross-sectional area point A is situated closer to the circumferential groove 4, into which that lateral groove 7 opens, than the point B at the terminal end of the increasing cross-sectional area region, where the cross-sectional area is the maximum. Thus, in the tire according to the invention, even if the lateral groove 7, 8 has an intermediate portion with the maximum cross-sectional area and terminates in the land portion 5, 6 with a diminished shape, as exemplarily shown in FIG. 6(b), the minimum cross-sectional area point A is always situated closer to the circumferential groove 2, 4 than the maximum cross-sectional area point B.

In the tire configured as above, as exemplarily shown in FIG. 6(c), it is preferred that the minimum cross-sectional area point A of the lateral groove 7, 8 is situated, as measured from the opening end into the circumferential groove 4, 2, at a location within 50% of the length l of the lateral groove 7, 8, and it is also preferred that the ratio S1/S2 of the minimum cross-sectional area S1 to the maximum cross-sectional area S2 of the lateral groove 7, 8 is within a range of not less than 0.1 and not more than 0.75.

(Test 1)

Figure 8:
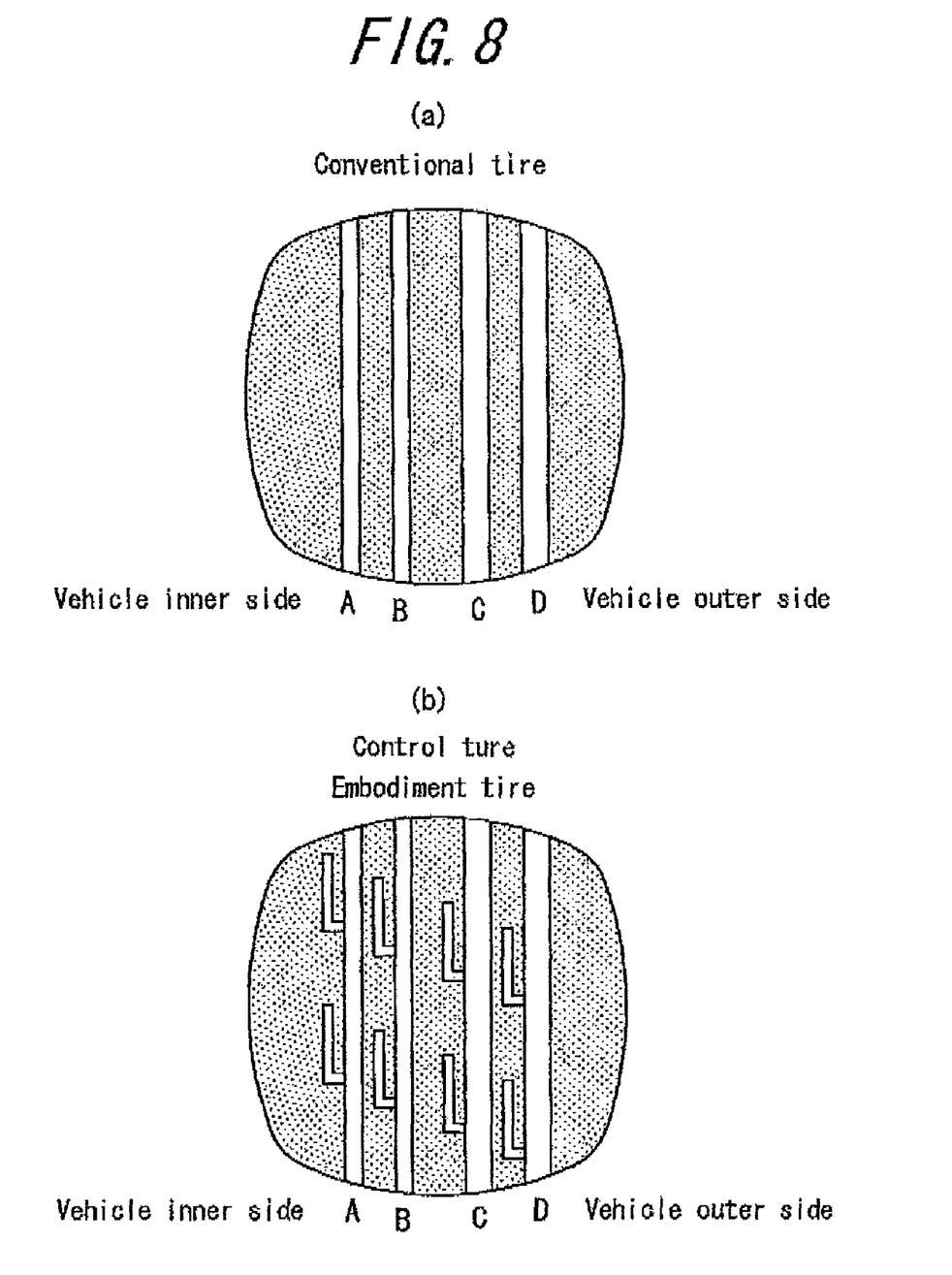
FIGS. 8(a) and 8(b) are views showing the footprint of an embodiment tire.

Test has been conducted with reference to various tires having a tread pattern as shown in FIG. 8(a), defined by four circumferential grooves extending continuously in the circumferential direction, and substantially L-shaped lateral grooves provided for each circumferential groove so that their one ends open into the relevant circumferential groove and their other ends terminate in the relevant land portion. The circumferential grooves A, B, C, D have their lengths of 140 mm, 150 mm, 150 mm, 140 mm, respectively, in the ground contact surface. The lateral grooves each has a groove width of 4 mm, a constant length (75 mm). The cross-sectional area of the lateral groove is varied within a range of 16 to 22 $mm^2$ for the minimum cross-sectional area point and set to 28 $mm^2$ for the maximum cross-sectional point. For these tires, drum test has been carried out so as to ascertain the sound pressure lowering effect for the columnar resonance noise (approximately 900 Hz) based on a standard JASO C606, at a speed of 60 km/h. The results of the test are shown in Table 1 below.

Incidentally, the comparative tire listed in Table 1 is a tire as shown in FIG. 8(b) having lateral grooves with a cross-sectional area that is constant (28 $mm^2$) throughout the entire length. Further, the control tire as a reference for the sound pressure level does not have any lateral grooves. Here, the tested tires each has a size of 225/55/R17, the approved rim is 7J×17, the inflation air pressure is 210 kPa and the load is 4.95 kN.

TABLE 1

| Tire type | S1/S2 | S1 point (%) | S2 point (%) | Sound pressure level reduction at 1,000 Hz, relative to control tire |
|---|---|---|---|---|
| Comparative Tire 1 | 1.0 | — | — | −2.5 dB |
| Example Tire 1 | 0.8 | 0 | 90 | −2.8 dB |
| Example Tire 2 | 0.8 | 30 | 60 | −2.6 dB |
| Example Tire 3 | 0.8 | 60 | 30 | −2.2 dB |
| Example Tire 4 | 0.7 | 0 | 90 | −3.3 dB |
| Example Tire 5 | 0.7 | 30 | 60 | −3.2 dB |
| Example Tire 6 | 0.7 | 60 | 30 | −2.3 dB |
| Example Tire 7 | 0.6 | 0 | 90 | −3.5 dB |
| Example Tire 8 | 0.6 | 30 | 60 | −3.3 dB |
| Example Tire 9 | 0.6 | 60 | 30 | −2.5 dB |

Notes:
S1: Minimum cross-sectional area of lateral groove
S2: Maximum cross-sectional area of lateral groove
S1 point: Ratio of lateral groove length between opening end and the position of S1, to its total length
S2 point: Ratio of lateral groove length between opening end and the position of S2 to its total length From Table 1 above, it will be appreciated that the columnar resonance noise of the circumferential grooves can be effectively reduced by the provision of the lateral grooves, and the example tires provide marked reduction effect for the columnar resonance noise by arranging the minimum cross-section area point at a location sufficiently close to the circumferential grooves and making small the cross-sectional area ratio of the lateral grooves.

Figure 7:
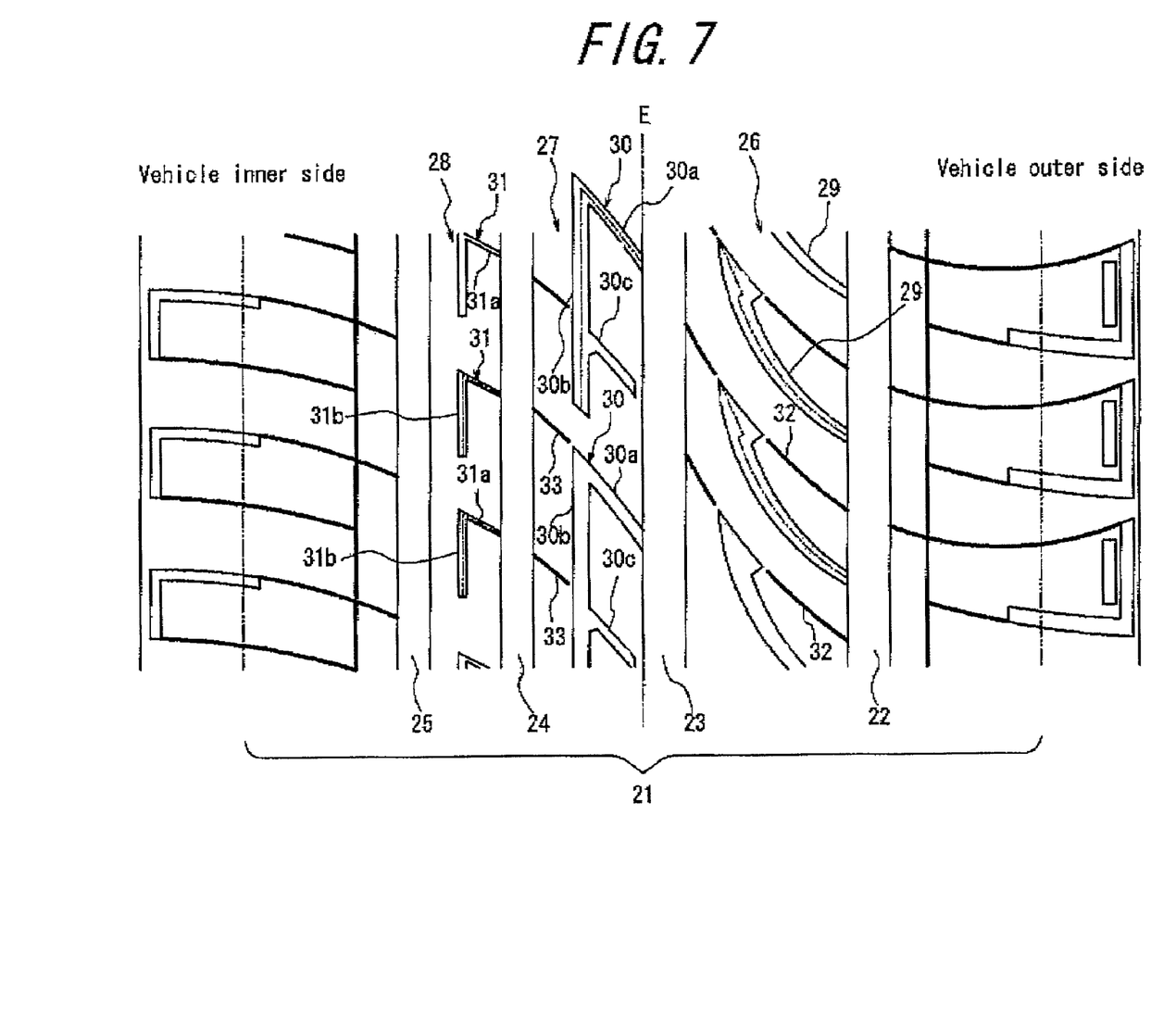
FIG. 7 is a developed view of the tread pattern embodying the pneumatic tire according to the second aspect of the invention.

The present invention in its second aspect provides a pneumatic tire having a tread pattern, of which the developed view is shown in FIG. 7. The pneumatic tire has an internal reinforcing structure which is similar to that of a general radial tire; hence, illustration of this structure is omitted.

Reference numeral 21 denotes a tread surface that is divided into left-half and right-half portions with reference to a tire equatorial line E as shown in the figure. The right-side half, which is situated on the outer side of a vehicle when the tire is mounted to the vehicle, is provided with two circumferential grooves 22, 23 continuously extending in a straight manner in the circumferential direction and having a groove width within a range of 4 to 20 mm, for example. The circumferential grooves are spaced from each other by a predetermined distance. The left-half side to be situated on the inner side of the vehicle is provided with two circumferential grooves 24, 25 continuously extending in a straight manner in the circumferential direction and having a groove width within a range of 4 to 20 mm, for example. The circumferential grooves 22, 23 have mutually the same groove volume with each other, and the circumferential grooves 24, 25 have a constant groove volume which is smaller than that of the circumferential grooves 22, 23.

Three rows of land portions 26, 27, 28 are defined by the circumferential grooves 22 to 25. These land portions 26, 27, 28 are each provided with a plurality of lateral grooves 29, 30, 31, having their one ends opened into the relevant circumferential groove 22, 23, 24 which are situated on the outer side of the vehicle when the tire is mounted to the vehicle, and further having the other ends terminating in the relevant land portion 26, 27, 28.

Here, each lateral groove 29 extends toward upper left in the land portion 26 and has one end opened into the outermost circumferential groove 22 and the other end terminating in the land portion 26 with a shape of a fishing hook. Each lateral groove 30 extends in the land portion 27 and has one end opened into the circumferential groove 23 adjacent to the outer side of the tire equatorial line E, and includes a base portion 30a extending from the circumferential groove 23 toward upper left, a bent portion 30b that is bent at an intermediate location of the land portion 27 to extend in parallel with the tire equatorial line E, i.e., downwards in the figure, and a branch portion 30c that is branched at intermediary of the bent portion toward the circumferential groove 23 in parallel with the base portion 30a but without opening into the latter. Each lateral groove 31 extends in the land portion 28 and has one end opened into the circumferential groove 24 on the side of the tire equatorial line E, and includes a base portion 31a extending from the circumferential groove 24 toward upper left, and a bent portion 31b that is bent at an intermediate location of the land portion 28 to extend in parallel with the tire equatorial line E, i.e., downwards in the figure.

Therefore, these lateral grooves 29, 30, 31 are formed independently from other circumferential grooves, other lateral grooves that may be provided to open into such other circumferential grooves, and other lateral grooves that may be opened at the ground contacting ends of the tread, apart from the relevant circumferential grooves.

Each of the circumferential grooves 22 through 25 and the lateral grooves 29, 30, 31 has a groove width that is determined such that its opposite groove walls do not contact each other over the entirely of its depth, under a tire posture wherein the tire is mounted onto an approved rim, filled with the maximum air pressure and loaded with a mass that corresponds to the maximum load capacity of the tire. Each of the lateral grooves 29, 30 (except the lateral grooves 31) has at least locally a groove width of not less than 30% of the groove width of the circumferential groove 22, 23, and an extending length which is not less than 40% (preferably within a range of 40 to 90%) of the extending length (typically with a range of 60 to 250 mm) of the circumferential grooves 22, 23 in the ground contact surface. Thus, in the tire shown in FIG. 7, only the lateral grooves 29, 30 constitute the lateral groove within the meaning of the invention.

The extending length of the lateral grooves 29, 30 in the two rows of land portions 26, 27 (except the land portion 28) is varied within a range of 40 to 90% of the relevant circumferential grooves 22, 23. As a result, the ratio of the extending length of the lateral grooves 29, 30 in the ground contact surface, to the extending length of the circumferential grooves 22, 23 in the ground contact surface, into which the lateral grooves are opened, is preferably varied.

Moreover, in the illustrated tire, the lateral grooves 29, 30 are opened into the respective circumferential grooves 22, 23 having the maximum volume, and the tread pattern is made asymmetrical with respect to the tire equatorial line E.

In the illustrated tire, the lateral grooves 29, 30 are opened into the relevant circumferential grooves which are situated on the outer side of a vehicle when the tire is mounted to the vehicle. However, he lateral grooves 29, 30 may be opened into the relevant circumferential grooves which are situated on the inner side of the vehicle. In this instance, these lateral grooves may serve to more effectively reduce the noise in the vehicle cabin.

In the pneumatic tire configured as above, the extension length of the lateral grooves 29, 30 is made different for each land portion 27, 27 so as to make it possible, as explained above, to effectively lower the sound pressure originally generated due to the provision of the circumferential grooves and disperse the resonance frequency over a wide range so as to effectively make the columnar resonance noise as a white noise.

In FIG. 7, reference numeral 32 denotes inclined sipes formed in the land portion 26 to extend toward upper left with a curved shape in which the convex side is faced downwards, so as to open into the circumferential groove 22. Further, reference numeral 33 denotes inclined sipes formed in the land portion 27 to extend toward upper left with a curved shape in which the convex side is faced upwards, so as to open into the circumferential groove 24.

(Test 2)

Various tires of a size 215/60&16 were assembled to rims of 7J×16, inflated with air pressure of 220 kPa and mounted to passenger cars made in Japan, and subjected to running test around a test course under the load condition of twp passengers. The rudeness of the columnar resonance noise generated has been evaluated with a ten step scale by the test driver's feeling. The result of such evaluation is shown in Table 2 below.

Incidentally, the conventional tire listed in Table 2 has four circumferential grooves of substantially the same ground contact length, as exemplified by the footprint of FIG. 8(a). The comparative tires and example tires each has a basic footprint as shown in FIG. 8(b), in which the circumferential grooves of the conventional tire are added with lateral grooves with a hook-like bent and in which the length of the lateral grooves is varied relative to the length of the circumferential groove, including a variation of 0%.

Here, the circumferential grooves A, B, C, D have their groove widths of 8 mm, 8 mm, 10 mm and 10 mm, and their lengths of 140 mm, 150 mm, 150 mm, 140 mm, respectively, both in the ground contact surface.

TABLE 2

Ratio of lateral groove length to circumferential groove length (%)
Location of circumferential groove

| | A (Inner side) | B | C | D (Outer side) | |
|---|---|---|---|---|---|
| Circumferential groove volume index | 100 | 100 | 150 | 150 | Evaluation |
| Conventional Tire | 0 | 0 | 0 | 0 | 5.0 |
| Comparative Tire 2 | 50 | 50 | 50 | 50 | 6.5 |
| Comparative Tire 3 | 0 | 50 | 50 | 0 | 6.5 |
| Example Tire 10 | 0 | 40 | 50 | 20 | 7.0 |
| Example Tire 11 | 0 | 40 | 50 | 70 | 7.5 |
| Example Tire 12 | 50 | 40 | 0 | 50 | 7.0 |
| Example Tire 13 | 50 | 0 | 40 | 50 | 7.25 |
| Example Tire 14 | 40 | 0 | 70 | 0 | 7.25 |
| Example Tire 15 | 0 | 40 | 0 | 70 | 7.0 |

It can be seen that Example Tires 10, 11 of Table 2 are able to realize excellent noise reduction effect by dispersing the lateral groove length relative to the circumferential groove length, and such noise reduction effect is more advantageously achieved when the lateral groove length is dispersed within a range of 40 to 70%.

The invention claimed is:

1. A pneumatic tire comprising a tread surface provided with at least two circumferential grooves extending continuously in a circumferential direction, wherein at least one of said circumferential grooves is provided with a plurality of lateral grooves each having one end opened into that circumferential groove and the other end terminating in a land portion, independently from other circumferential grooves, other lateral grooves opening into said other circumferential grooves or in a ground contacting end of a tread, said circumferential grooves and said lateral grooves having their respective groove widths determined such that their opposite groove walls do not contact each other under a tire posture wherein the tire is mounted onto an approved rim, filled with the maximum air pressure and loaded with a mass that corresponds to the maximum load capacity of the tire, said lateral grooves being arranged so that at least one lateral groove is always included completely in the ground contact surface of the tread, said groove width of the lateral grooves being smaller than said groove width of said circumferential grooves but at least locally not less than 30% of the groove width of said circumferential grooves, and said lateral grooves each having an extending length which is not less than 40% of an extending length of said circumferential grooves in said ground contact surface, wherein:

said lateral grooves are each provided with a region having a cross-sectional area which increases from its side of opening end into the circumferential groove toward its side of the terminal end, said increasing cross-sectional area region having a starting end with a minimum cross-sectional area point, which is situated closer to the circumferential groove in which the lateral groove opens, than a maximum cross-sectional area point at the terminal end of said region of increasing cross-sectional area, and said groove width of said circumferential grooves, along an entire length of said circumferential grooves in said ground contact surface, is larger than said groove width of said lateral grooves.

2. The pneumatic tire according to claim 1, wherein said minimum cross-sectional area point is situated at a location within range of not more than 50% of the length of said lateral groove, from the opening end of the lateral groove into the circumferential groove.

3. The pneumatic tire according to claim 1, wherein said lateral groove has a ratio (S1/S2) of the minimum cross-sectional area (S1) to the maximum cross-sectional area (S2), said ratio being within a range of not less than 0.1 and not more than 0.75.

4. The pneumatic tire according to claim 2, wherein said lateral groove has a ratio (S1/S2) of the minimum cross-sectional area (S1) to the maximum cross-sectional area (S2), said ratio being within a range of not less than 0.1 and not more than 0.75.

5. A pneumatic tire comprising a tread surface provided with at least two circumferential grooves extending continuously in a circumferential direction, wherein at least one of said circumferential grooves is provided with a plurality of lateral grooves each having one end opened into that circumferential groove and the other end terminating in a land portion, independently from other circumferential grooves, other lateral grooves opening into said other circumferential grooves or in a ground contacting end of a tread, said circumferential grooves and said lateral grooves having their respective groove widths determined such that their opposite groove walls do not contact each other under a tire posture wherein the tire is mounted onto an approved rim, filled with the maximum air pressure and loaded with a mass that corresponds to the maximum load capacity of the tire, said lateral grooves being arranged so that at least one lateral groove is always included completely in the ground contact surface of the tread, said groove width of the lateral grooves being smaller than said groove width of said circumferential grooves but at least locally not less than 30% of the groove width of said circumferential grooves, and said lateral grooves each having an extending length which is not less than 40% of an extending length of said circumferential grooves in said ground contact surface, wherein:

at least two rows of the land portions are provided with said lateral groove, and said lateral groove has different extending lengths in the respective land portions, and said groove width of said circumferential grooves, along an entire length of said circumferential grooves in said ground contact surface, is larger than said groove width of said lateral grooves.

6. The pneumatic tire according to claim 5, comprising a lateral groove that opens into a circumferential groove with a maximum groove volume.

7. The pneumatic tire according to claim 5, having a tread pattern that is asymmetrical with respect to an equator of the tire, and said lateral groove is arranged to open into a circumferential groove that extends on an inner side of a vehicle when the tire is mounted to the vehicle.

* * * * *